United States Patent
O'Brien

Patent Number: 6,065,690
Date of Patent: May 23, 2000

[54] TENSION ACTUATED SUBMERGED LIQUID DISPENSER

[76] Inventor: Daniel O'Brien, 2614 Queenswood Drive, Victoria, BC, Canada, V8N 1X5

[21] Appl. No.: 09/192,297

[22] Filed: Nov. 17, 1998

Related U.S. Application Data

[60] Provisional application No. 60/066,410, Nov. 24, 1997.

[51] Int. Cl.$^7$ .................................................. B01D 17/00
[52] U.S. Cl. ..................... 239/328; 210/198.1; 422/265
[58] Field of Search ..................... 239/34, 37, 38, 239/39, 328; 210/198.1, 242.1; 422/265, 277

[56] References Cited

U.S. PATENT DOCUMENTS

| | | |
|---|---|---|
| 1,831,476 | 11/1931 | Bennett . |
| 2,934,409 | 4/1960 | Biehl ..................................... 210/242.1 |
| 3,273,957 | 9/1966 | Beredjick . |
| 3,425,791 | 2/1969 | Koberg . |
| 3,760,805 | 9/1973 | Higuchi ................................... 128/127 |
| 4,300,558 | 11/1981 | Eckenhoff et al. ..................... 128/260 |
| 4,880,547 | 11/1989 | Etani ...................................... 210/728 |
| 5,064,624 | 11/1991 | King ....................................... 422/264 |
| 5,298,248 | 3/1994 | Hugues et al. ......................... 424/400 |
| 5,324,428 | 6/1994 | Flaherty ................................. 210/232 |

*Primary Examiner*—Andres Kashnikow
*Assistant Examiner*—Jorge Bocanegra

[57] ABSTRACT

A tension-actuated submerged dispenser for discharging a liquid of one composition into liquid surroundings constituted by a liquid of a different constitution is useful for unattended employment to maintain a certain quality of composition in the surroundings. On the other hand, the quality of composition of liquid in the dispenser can be jeopardized if liquid from outside the container is allowed in, as has been the case with some earlier known submerged dispensers which employed a displacement liquid. In order to develop the necessary pressure to express a liquid through an orifice in a submerged container into which no such displacement liquid is allowed entry, a system of actuating a reduction of enclosed volume by means of tensing a container between opposed end-effectors has been developed. The source of pulling force can be either an externally attached weight or float, or a dispensed liquid which is differentiated as to specific gravity from that of the liquid surroundings.

9 Claims, 2 Drawing Sheets

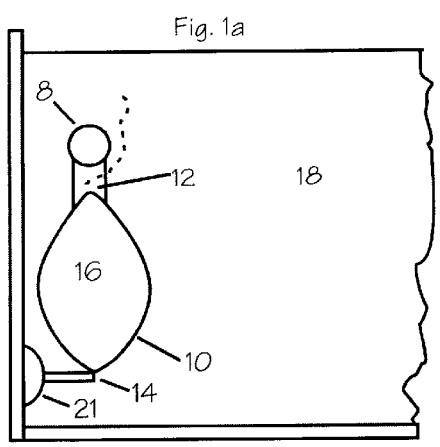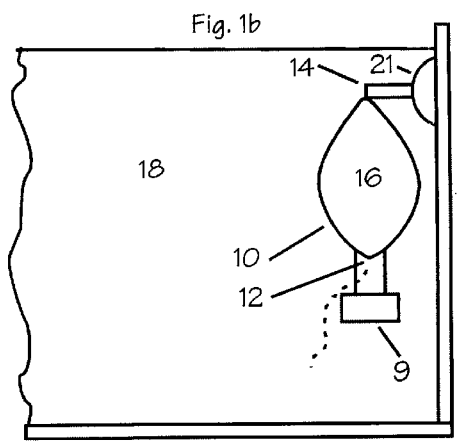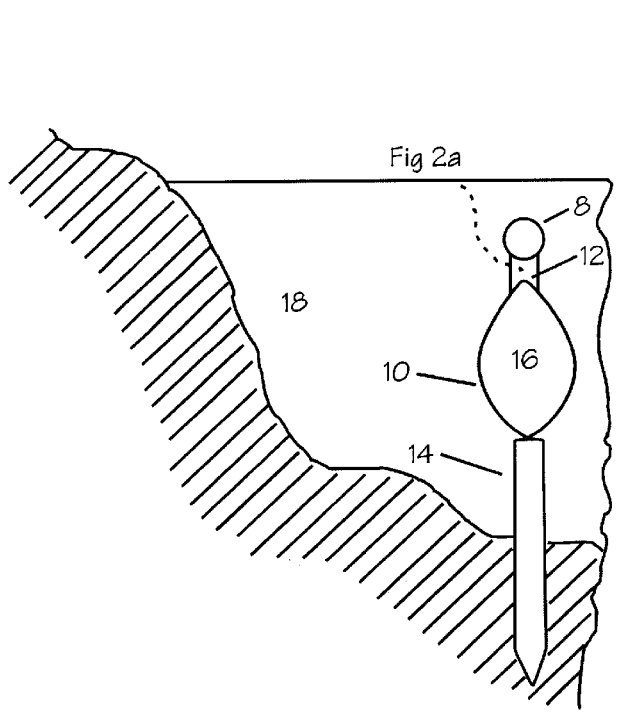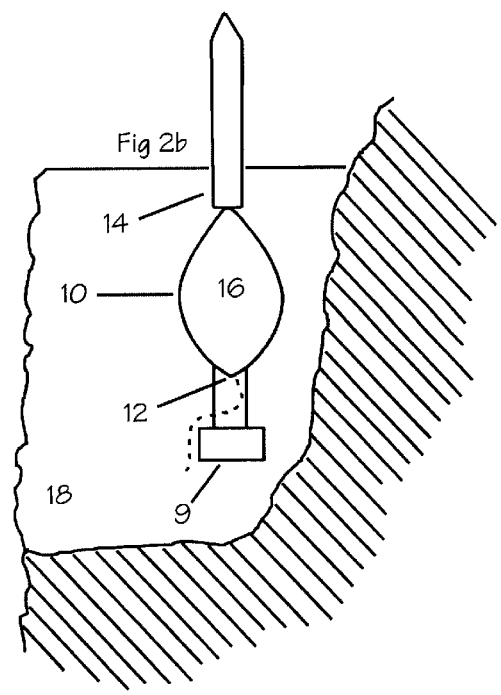

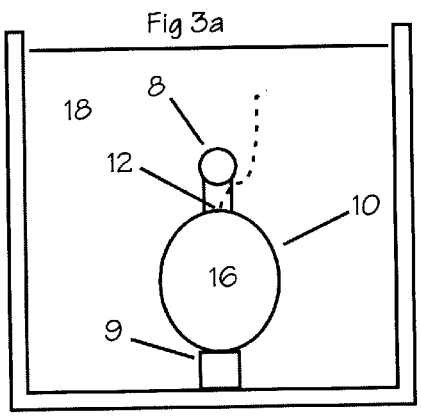
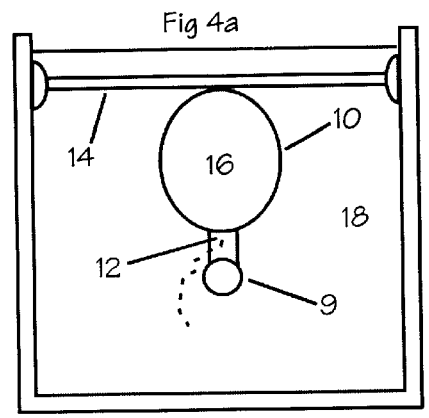
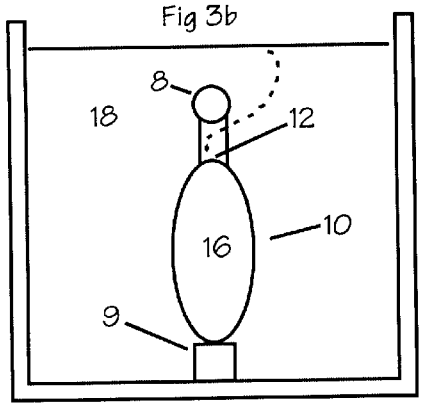
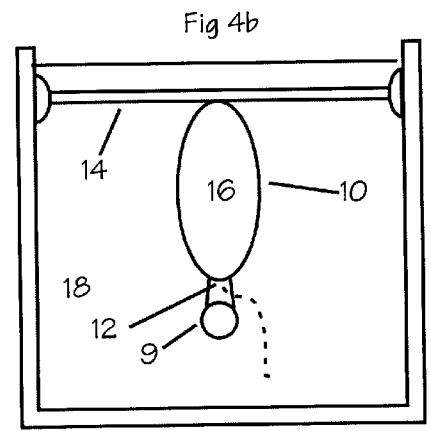
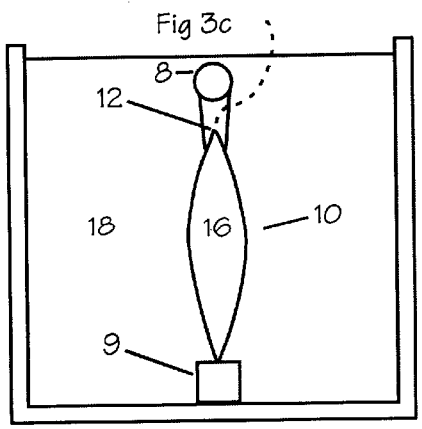
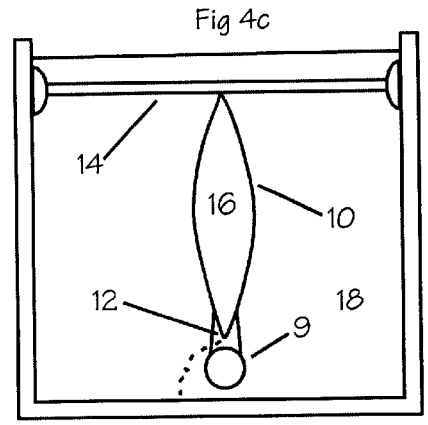

TENSION ACTUATED SUBMERGED LIQUID DISPENSER

CROSS-REFERENCE TO PROVISIONAL APPLICATION

The subject-matter of this invention is substantially as described in the same inventor's U.S. Provisional Application for U.S. patent No. 60/066,410, filing date: Nov. 24, 1997, entitled SUBMERGED DISPENSER FOR LOW-RATE DOSING OF A POOL, the disclosure content of which is herein incorporated by reference.

BACKGROUND OF THE INVENTION

In general, the invention relates to a mechanically deformable container type dispenser for submerged discharge of a quantity of liquid from the dispenser into liquid surroundings. More particularly, the dispenser is a type wherein the wall structure of an orificed container is comprised by a flaccid membrane, with which opposed end effectors at the ends thereof are combined in a manner whereby said end effectors constitute means for applying tension to the wall structure in order to actuate dispenser operation.

All embodiments of the invention are capable of operation unattended at a submerged site in a surrounding liquid of a first composition, releasing thereinto—at a low rate of discharge—a liquid of a second composition.

To clarify by example what is meant by 'low rate', an approximately palm-sized unit embodying the invention has been used to discharge two hundred and fifty (250) milliliters of liquid over a period of about five hundred (500) hours—nearly three weeks—thus averaging a discharge of only about 0.5 milliliters per hour. After opening a previously closed orifice in this small unit, the user simply allows the unit, which is appropriately weighted, to sink into the liquid body which will receive the 'dose' of liquid automatically discharged from such a pre-filled packet-like product.

There are numerous purposes to which embodiments of the invention may be applied with advantage, in preference to a considerable diversity of known types of dispensers which also possess utility for unattended submerged discharge of a liquid at a low rate. Some devices for submerged dispensing are known wherein the liquid specifically to be discharged is displaced from a container by allowing a different liquid thereinto, drawn either from the surroundings or from a separate container elevated higher than the immediate liquid surroundings of the dispenser container, in order to develop an excess of hydrostatic pressure. Such approaches are limited to a somewhat narrow range of applications, however, because pre-discharge admixture of some displacement liquids and some dispensed liquids is highly unfavourable to maintaining constant compositional qualities of the latter, for the comparatively long period of time entailed by a low discharge rate. Furthermore, in view that the dispenser containers for carrying out such approches are typically rigidly constructed, ie. with rigid wall structure, such dispensers occupy as much submerged volume after discharging their contents as before, and this can be undesirable when unobstructed space within the liquid surroundings is at a premium.

The invention is excellently suited to replenishment or preservation of a chemical constituent which is intended to be maintained at a certain concentration in a liquid body that may be subjected to some foreseeable type of depletion process. Depletion processes which the invention is useful to counteract may include any of the following: evaporative loss of volatile constituents; alteration of constituents due to chemical reaction; precipitative deposition of solutes; nutritive consumption of constituents by biological organisms; and removal by mechanical means of constituents which adhere to surfaces of articles dipped into and retracted from a liquid body.

Although the genesis of the invention in its earliest embodiments was in the context of swimming pool treatment means to assure a desired quality of pool water, and to reduce swimming pool operating costs, it should be noted that most if not all of the foregoing depletion processes may in many instances be normally incurred in settings of use wherein a particularly constituted and/or treated liquid body is employed for productive purposes in such fields of enterprise as the following: chemical processing in general; liquid waste treatment; biotechnology (including fermentation of beverages and culture of anti-biotic medicines); aquaria; mariculture; agriculture (including paddy cultivation, and hydroponics); floriculture; decorative garden ponds; animal husbandry; and textile processing (dip dyeing).

Swimming pool and therapeutic spa treatments employing the invention have to date been more thoroughly investigated from a marketing standpoint, but any one or more of the foregoing diverse types of enterprises may well ultimately consume a larger number of tension-actuated submerged dispensers constructed in accordance with the invention. For example, needed nutritional supplements for cattle and hogs are very conveniently provided by means of tension-actuated dispensers submerged in drinking troughs or in-the-ground livestock drinking reservoirs ('waterholes'), and it seems reasonable to suppose that the number of such troughs and waterholes, on a worldwide basis, far exceeds the total number of swimming pools and spas.

SUMMARY OF THE INVENTION

General objects like economical manufacturing and convenience of use are as desirable in the case of this invention as with any well-designed new article intended for commerce, but apparatus reliability is an object of special pertinence with respect to the present invention, inasmuch as (a.) without requiring control means remote from the liquid surroundings, a submerged liquid-dispensing apparatus really is not as accessible for making post-installation adjustments, as an unsubmerged apparatus would be; (b.) a low rate of discharge over an extended period of time naturally entails more time during which a variety of events in the surroundings could conceivably interfere with dispenser functioning; and, (c.), more generally, because the appeal of this type dispenser to users so largely depends on its being simply droppable into the operational environment with worry-free assurance it will perform its intended function unattended.

A second object of special pertinence is versatility of application. In view of the diversity of liquids which are usefully discharged into liquid surroundings, as suggested above in connection with identifying typical purposes to which the invention is suited, it is especially desirable to specify dispenser actuation means in such a way as to accomodate discharged liquids having specific gravities either above, below, or the same, as that of any surrounding liquid which is to receive the discharged liquid in a given case.

The sought-for qualities of reliability and versatility have been found to be best procured by employing a flaccid membrane for the wall structure of an orificed, shape-deformable, submerged container having end-effectors at opposite ends thereof, such that said end-effectors constitute means for applying tension to the wall structure, stressing it in order to actuate dispenser operation by causing the container wall to progressively flatten against a quantity of liquid in the container which slowly diminishes as a stream of the discharged liquid escapes through a suitably sized orifice in the container. A float is particularly effective as a upwardly pulling end-effector, whereas a weight is particularly effective as a downwardly pulling end-effector. Depending on the specific gravity of the liquid to be discharged, relative to that of the surrounding liquid, there may simply be a use of contained liquid itself to serve as an end-effector, in view of the buoyancy or alternatively weight thereof. In some cases fixturing means or a frame can supply a tensioning point which is pulled against.

In the interest of greater clarity with regard to the versatility that is attained in accordance with the invention, it seems apropos here to recall that in the incorporated-by-reference related application (ie. the provisional application), FIGS. 3a–3c depicted an embodiment specifically for dispensing a liquid of lesser density than the surroundings, therefore requiring only a lowermost end-effector comprising a weight. To enable a similar embodiment to dispense a liquid of greater density than the surroundings, it is evident that an uppermost end-effector comprising a float could be added opposite the weight. That a float as uppermost end-effector has been contemplated and disclosed in the provisional application is shown by reference to FIG. 2b therein. Similarly, in order to enable an embodiment like the one shown in FIGS. 4a–4c of the provisional application to dispense a liquid of lesser density than the surroundings, a lowermost end-effector comprising a weight could be added. That use of a weight as an end-effector has been contemplated and disclosed in the provisional application is shown by reference to FIGS. 3a–3c therein. Again similarly, to the embodiments depicted in FIG. 1a and FIG. 2a of the provisional application, a float as an uppermost end-effector could be added, and to the embodiments depicted in FIG. 1b and FIG. 2b of the provisional application, a lowermost end-effector comprising a weight could be added. It is readily apparent also that opposed pairs of uppermost and lowermost end-effectors attached to a tension-actuated, shape-deformable, submerged container will provide a capability for dispensing a liquid irrespective of its relative density with regard to the surroundings.

Bearing these matters of clarification (without introducing any new subject-matter) in mind, it is seen that the invention is indeed versatile.

Tension by means of pulling forces applied from the ends of a deformable container, and the fact that the container has a suitably sized orifice in it for escape of a stream of the contents as the container tends to be flattened, provide a highly reliable principle of operation.

Details of structures and arrangement, plus recommended manners of manufacturing submerged dispensers embodying the invention, and suggestions how to deploy such dispensers to convenient advantage, are addressed below with reference to the figures of drawing next identified.

BRIEF DESCRIPTION OF DRAWINGS

FIG. 1a illustrates an embodiment wherein the opposed end-effectors are a suction cup-type fixture and a float.

FIG. 1b illustrates an embodiment wherein the opposed end-effectors are a suction cup-type fixture and a weight.

FIG. 2a shows an embodiment wherein the opposed end-effectors are a float and an embedded stake.

FIG. 2b shows an embodiment wherein the opposed end-effectors are a weight and a floating stake.

FIGS. 3a–3c illustrate an embodiment at three intervals in the process of tensed container wall structure being flattened between float and weight end-effectors.

FIGS. 4a–4c illustrate an embodiment at three intervals in the process of tensed container wall structure being flattened between weight and frame type end-effectors.

DETAILED DESCRIPTION OF THE INVENTION

With reference to FIG. 1a, float 8 is an uppermost end-effector which pulls upwardly on deformable container 10 against the opposed resistance provided by fixturing means 14 secured to the glass wall of an aquarium tank by suction cup 21. The result of such pulling is to strain the wall membrane of container 10, tending to flatten the container and thereby pressurizing the container content 16, thus forcing a continuous thin stream of liquid (or suspension) 16 out into surrounding liquid 18 through orifice 12. If liquid 16 in this instance is assumed to be of lesser density than liquid 18, then the float 8 could be omitted, for the buoyancy of the content itself of container 10 would then serve functionally as an upwardly pulling end-effector.

With reference to FIG. 1b, weight 9 is a lowermost end-effector which pulls downwardly on deformable container 10 against the opposed resistance provided (again) by fixturing means 14 secured to the glass wall of an aquarium tank by suction cup 21. The result of such pulling is the same as in the previous figure, but here, if liquid 16 in this instance is assumed to be of greater density than liquid 18, then weight 9 could be omitted, for the weight differential of the dispensed liquid 16 would then make it serve as a downwardly pulling end-effector.

The invention, however, would not, if the free end-effectors shown in FIGS. 1a and 1b, respectively were omitted, discharge a liquid of specific density exactly equal to that of the liquid surrounding. It is easy to see that in such a case either version, as shown, would suffice. These two versions, incidentally, are easily provided as a single commercial product, by simply making the weight and the float detachable and interchangeable, and of course optional in both cases, in view that a given fishtank liquid treatment chemical may in fact be heavy enough or light enough that the container will discharge its contents (after filling, say by means of a syringe), without an externally mounted free end-effector at all, since the dispenser content would then amount to an internally provided source of container-tensing power. A further point to note is that the rate of discharge of a liquid that can be discharged without a weight or float can be modified by using one or the other: a weight in conjunction with a heavy dispensed liquid will cause a faster discharge, and a float with a lighter liquid will do so also.

With reference next to FIGS. 2a and 2b, the principle of operation and essential interrelation of elements are the same as in the first example. Here the environment of use is a natural pond, into the earthen bottom of which a fixturing means 14 comprising a wooden stake can be embedded as shown in FIG. 2a, in which case a float type end-effector 8 is again appropriately used when the liquid to be discharged is not sufficiently differentiated by a lower density from that of the surroundings to obtain the desired discharge. In FIG. 2b, on the other hand, a weight 9 is shown working in opposition to the buoyant force provided by a wooden stake in a non-embedded orientation. Such a variant would be easier to check on and retrieve, if that were desired. Again, exactly as above and for the same reasons, the float 8 and the weight 9 are optional, unless that is, a liquid of the same density as the surrounding liquid is to be dispensed. Sans float, an apparatus as in FIG. 2*a* would be excellent for releasing a low density film-forming chemical so as to coat the surface of a reservoir in order to prevent excessive evaporative loss therefrom of water. The dispensed liquid from the apparatus as shown in FIG. 2*b*, but sans the weight, alternatively could be a heavy bromine compound for disinfecting a contaminated reservoir or pond.

While the first two sets of figures illustrating embodiments of the invention above featured overall structures which, with the exception of alternative liquid contents, are the same both for upwardly and downwardly directed flows of discharging contents, although the structures are in the appropriate cases inverted and slightly differently sited, the following third and fourth examples are provided in contemplation that it is nothing unusual to supply dispensers equipped with installation means suited to just one particular intended direction of flow.

With reference to FIGS. 3*a*–3*c* depicting the same embodiment at three intervals in time, as container 10 progressively flattens, the site-holding function is by means of the weight 9. Orifice 12 is built into the top of container 10, above which, preferably, an optional float 8 is detachably secured by attachment means whereby the upwardly pulling force of the float contributes to tensing the membraneous container wall. As already noted above, a dispensed liquid of lower density relative to that of the surroundings will by itself produce a buoyancy force and will interiorly push upwardly against the top of the container, in that manner tensing its wall structure, and the purpose of the float therefore is merely to increase the available net upwardly pulling container-tensing force. In order to prevent either kind of source of buoyancy from raising the whole dispenser to the surface of the liquid surroundings, of course, the mass provided by weight 9 must be appropriately proportioned—taking into consideration both the buoyancy of a float 8 and the relative density of the dispensed liquid.

Pertaining next to the embodiment of the invention shown in FIGS. 4*a*–*c*, wherein container 10, assumably filled with a dispensable liquid of higher specific gravity than that of surrounding liquid, hangs suspended from the site-holding fixturing means comprised by legged frame 14. The point of attachment of the container with this frame is the tensioning point pulled upon by membraneous wall structure of the container, by means of weight 9.

Any dispensably flowable substance which may be both heavy and somewhat viscous, the definition of "liquid" herein encompassing even syrupy and pasty compounds, such as a crack-sealing compound or glue, can be steadily discharged from an embodiment of this last exemplified type. Again, as in above cases, a free end-effector, whether a float or (as here) a weight, is best regarded as an option which is useful when development of a larger force tending to flatten the container by expressing the content therefrom is needed.

It will be readily understood by now that every embodiment of the disclosed invention operates in accordance with the same actuation concept as in the case of other embodiments, namely: that the volume of a flaccid container initially filled with a liquid to be dispensed will diminish as the membraneous container wall is tensed between opposed tensioning points, at least one of which must be associated with structure which is free to move in a direction away from the opposite point. The illustrated example of an embodiment with both a float and a weight, where the weight is well away from the bottom of the use surroundings, as shown in FIG. 2*b*, functions no differently with respect to the foregoing concept of actuation than any other version of the invention, say for example: the embodiment shown in FIGS. 3*a*–*c*.

Issues regarding certain constructional features will next be addressed, emphasizing particularly a distinction between essential and non-essential features pertaining to the various physical elements of any embodiment of the invention.

An orifice in the container is essential to dispensing, not only in the immediately obvious sense applicable to all containers of fluids whatever their nature, if the content is to be removed, but also in the sense that escape of liquid permits tensioning of container wall structure to change the shape of the container, and to cause its ever-diminishing volumetric capacity. One may contrast this circumstance to a similar flaccid-walled container holding a gas instead of a liquid, such as a weather balloon, in which case no orifice would be required in order to reduce the volume actually occupied by the gas, since gases are compressible, whereas with a liquid-filled, closed, flaccid-walled container having a tensioned wall, the shape thereof and volume of content will remain substantially constant irrespective of the magnitude of tension force. Thus it is the cooperation of an orifice allowing the liquid content to escape, and of a tensioned container wall structure, not the tensioning by itself, which in the invention make the process of pressurization of the content synchronous with reduction of the volume of contained liquid.

Relatedly it follows that it is not orifice size by itself which limits the rate of discharge of the content from any embodiment of the invention, such rate being a function of the proportioning of both orifice size and of amount of tension applied to the membraneous wall of the container. To make the point clear, it is possible to have a larger orifice and a lesser tension force operative in combination to produce a lower rate of discharge than produced by a somewhat smaller orifice and a greater tension force. For practical reasons, such as potential entry into a comparatively large orifice of fast-moving foreign material, especially when pressurization may be fairly low and unreliable to keep particles having significant momentum out, it is generally preferable to employ a smaller rather than a larger orifice, thus necessitating attention to means for increasing tensioning force.

Orifice location is another matter, not pertaining essentially to device actuation. Having the orifice built into the top of a container discharging a buoyant liquid content takes advantage of the tendency of the liquid to move upwardly and so can contribute to effective discharge, and similarly, the tendency of a liquid content which is heavier than the liquid of the surroundings to sag within a flaccid container can also be taken advantage of by an underside location of the orifice. These choices are appropriately preferred when it is desired to direct the discharge toward a certain area thus receiving it more promptly; however, location of the orifice is not normally essential to discharge occurring per se, since the tensioning of the container does not depend on orifice location, which might in fact be anywhere on the container, providing the requirement to completely void the container can be met. Progressive flattening of some embodiments of the invention, when dispensing liquids which tend to rise or sag to one end because of differentiation of specific gravity from the surroundings, could in some cases unevenly close the sides of a container progressively together, more toward one end than toward the other, as discharge proceeds, and therefore one does need to avoid any prospect of a side flattening against the interior of an orifice in a manner sealing it closed and thus perhaps trapping an undischarged quantity of contained liquid above or below a side-located orifice. This would not be a problem likely to occur in the case of dispensing a liquid of the same density as liquid of the surroundings, or with an embodiment having both upper and lower ends free to move, as when a container is tensed between a float and a weight as in FIG. 2b. The distribution of tension in such a case is more ideally from both ends pulling against one another, as distinct from embodiments wherein one free end-effector pulls against the resistance afforded by an anchored or fixtured type opposite end-effector. Therefore, it will be understood that an embodiment such as that shown in FIG. 2b, especially if used to dispense a liquid which does not tend to rise or sag within the container, lends itself to easier provision of a side-located orifice (not shown) instead of at an end of the container. Interestingly, the embodiment shown in FIGS. 3a–c, if it were used with a dispensed liquid heavier than the liquid of the surrounding, as conceivably it could be, could be feasibly equipped with a side-located orifice (not shown), and assurance against the sealing closed of the orifice by uneven container flattening could be gained by providing little enough of extra weight in the optional weight shown attached to the bottom of the container, so that the reduction of net weight of the submerged device due to discharge would at an appropriate moment cause it to rise from contact with the bottom or floor of the liquid surroundings. Similarly, a careful scaling of relative proportions of buoyancy in the float and weight of dispensable liquid could provide a device not needing an attached weight, which would act in the same way, rising as container content is discharged (not shown). Such and other non-illustrated variants can be developed within the scope of the invention with ease, once its principles are grasped as herein taught.

Essential to effective practice of the invention is understanding of the character of container shape-deformation and of the provision of a membrane type wall structure for the container. The material of the membrane has been described throughout the above discourse using the term 'flaccid', and for greater clarity it is now stated that this means that the material has a low bending modulus in thin construction but simultaneously is of high tensile strength and low elongation. Generally, a sheet of flaccid material as herein understood is easily folded, creased, or crumpled, by application of small magnitude forces, but is not easily stretched to dimensions much greater than as fabricated. The actuation concept of tensing the container to discharge its content through an orifice at a substantially steady and preferably slow rate would not be well served by use of rubber or similar material of high elongation with elastic recovery of changed dimensions. Such material would not be desirable for the type of submerged discharge contemplated, due to the highly progressive weakening of force causing the discharge in such a pre-expanded rubber bladder case, which would make it inherently impossible to obtain a fairly steady discharge over a long duration of time, unless simultaneously there were some means for changing the orifice size, say by enlarging it as available force diminishes, which is a highly undesirable complication of apparatus. The easy way to distinguish a variable-volume container made of high elongation wall material, on the one hand, and a variable-volume container made of low elongation wall material (as with the invention), on the other hand, is to note that the surface area of the wall structure is substantially unchanged in the latter case. That a continuous surface of a given constant area may enclose different volumes depending on the shapes to which the surface is contoured, closed upon itself, or in other words 'bent', is of course well established. The nature of deformation of the shape of a container constructed of thin low elongation material involves a change of surfacial contouring which is quite different from dimensial stretching of high elongation rubbery sheet material.

Typical materials which are well suited for use in fabricating the container element of any embodiment of the invention include polyvinyl chloride and polypropylene films. These and similar polymeric films are sufficiently liquid-impermeable and mechanically sound, and are easily cut into shaped gores which are sealable at the edges thereof to form excellent containers, the minimum number of gores needed being two. To fabricate a container, alternatively, the same polymeric substances may be blown as tubular film, or may be rotationally molded, and in all cases it is not difficult to form suitable orifices built into the container using wellknown techniques.

With regard to an optional detachable float and/or weight, such may be separately fabricated from the container and then attached to it by known means. In the case of a weight, a convenient option not illustrated in the figures is to emplace a strip of metal in a partly fabricated container before sealing its edges all around the gores comprising it. Also, it is readily understood that a built-in rather than attached float would simply be a matter of providing sufficient excess container material to seal about a pocketlike area permanently containing air.

At the point of manufacturing of products which constitute pre-filled dispensers, for supply to purchasers with the desired dispensable liquid already in each product unit, the liquid can be easily introduced to the container element by means of pumping through tubes or hollow needles momentarily inserted into apertures in container wall portions or edges which are subsequently sealed. Such apertures may or not be the discharge orifices themselves.

It has been suggested already in the SUMMARY above that use of the invention should normally involve no more imposition upon the user other than that pre-use orifice closure means be removed, followed immediately by placing the dispenser into the liquid surroundings where it typically will function unattended with great reliability for the length of time for which it is designed to discharge its content. One method of opening an orifice which is convenient to users is to cut across a marked line on the container, such cutting to remove the sealed portion of container wall edge structure adjacent a built-in channel comprising the orifice.

When the palm-sized packet-like product mentioned in the BACKGROUND is finally devoid of its content, it is flat and takes up little space, thus a large number of such units used successively over a long period of time can be allowed to accumulate at the bottom of a pool, if desired, before someday collecting them for recycling (also facilitated by the flatness).

What is claimed is:

1. A tension-actuated submerged dispenser comprising
   (a.) an orificed container having a shape-deformable wall structure consisting of low bending modulus and high tensile strength membraneous material, and
   (b.) a pair of opposed end-effectors at opposite ends of said dispenser, arranging said end-effectors vertically with respect to one another so that one of said end-effectors is a top end-effector and the other is a bottom end-effector,
and wherein a tension is applied to said wall structure of said container by means of a pulling force developed between the said end-effectors, said pulling force being developed by providing that at least one of said end-effectors is both free to move and is made to execute movement in an opposite direction from the other end-effector, causing said movement by providing that the moving end-effector is of a specific gravity differentiated from that of a surrounding liquid environment of use of said dispenser.

2. A tension-actuated submerged dispenser as in claim 1, wherein the said top end-effector is a float.

3. A tension-actuated submerged dispenser as in claim 1, wherein the said bottom end-effector is a weight.

4. A tension-actuated submerged dispenser as in claim 1, wherein the said top end-effector is a float, the said bottom end-effector is a weight, and wherein both end-effectors are free to move.

5. A tension-actuated submerged dispenser as in claim 1, wherein the said top end-effector is a float, the said bottom end-effector is a weight, and wherein only said float is free to move.

6. A tension-actuated submerged dispenser as in claim 1, wherein the said top end-effector is constituted by an upward pushing charge of liquid within said container, said liquid being of lesser specific gravity than liquid constituting said surrounding liquid environment of use.

7. A tension-actuated submerged dispenser as in claim 1, wherein the said bottom end-effector is constituted by a downward pushing charge of liquid within said container, said liquid being of greater specific gravity than liquid constituting said surrounding liquid environment of use.

8. A tension-actuated submerged dispenser as in claim 6, wherein the said top end-effector is constituted by an upwardly pushing charge of liquid within said container, said liquid being of lesser specific gravity than liquid constituting said surrounding liquid environment of use, and wherein said bottom end-effector is constituted by attachment means anchoring said dispenser to a side boundary wall of said surrounding liquid environment of use.

9. A tension-actuated submerged dispenser as in claim 6, wherein the said top end-effector is constituted by an upward pushing charge of liquid within said container, said liquid being of lesser specific gravity than liquid constituting said surrounding liquid environment of use, and wherein said bottom end-effector is constituted by means anchoring said dispenser to a bottom portion of boundaries of said surrounding liquid environment of use.

* * * * *